US006649139B2

(12) United States Patent
Tanaka et al.

(10) Patent No.: US 6,649,139 B2
(45) Date of Patent: Nov. 18, 2003

(54) PROCESS FOR PRODUCING A PURIFIED AQUEOUS HYDROGEN PEROXIDE SOLUTION

(75) Inventors: Fujio Tanaka, Sendai (JP); Takashi Adachi, Sendai (JP); Kazuhisa Mine, Sendai (JP); Kazuya Kimura, Sendai (JP)

(73) Assignee: Santoku Chemical Industries Co., Ltd., Tokyo (JP)

( * ) Notice: Subject to any disclaimer, the term of this patent is extended or adjusted under 35 U.S.C. 154(b) by 259 days.

(21) Appl. No.: 09/854,996

(22) Filed: May 14, 2001

(65) Prior Publication Data

US 2002/0012626 A1 Jan. 31, 2002

(30) Foreign Application Priority Data

| Jun. 21, 2000 | (JP) | ........................ 2000-186900 |
| Dec. 6, 2000 | (JP) | ........................ 2000-371996 |

(51) Int. Cl.$^7$ .............................................. C01B 15/01
(52) U.S. Cl. ...................................................... 423/584
(58) Field of Search ........................................... 423/584

(56) References Cited

U.S. PATENT DOCUMENTS

| 5,733,521 | A | * | 3/1998 | Minamikawa et al. ...... 423/584 |
| 5,851,402 | A | | 12/1998 | Dhalluin et al. |
| 5,928,621 | A | * | 7/1999 | Ledon et al. ................ 423/584 |
| 5,932,187 | A | * | 8/1999 | Ledon et al. ................ 423/584 |
| 5,961,947 | A | * | 10/1999 | Ledon et al. ................ 423/584 |
| 6,001,324 | A | | 12/1999 | Ledon et al. |

FOREIGN PATENT DOCUMENTS

| JP | 11-79717 A | 7/1989 |
| JP | 09-142812 A | 6/1997 |
| JP | 09-221305 A | 8/1997 |
| JP | 09-235107 A | 9/1997 |

* cited by examiner

Primary Examiner—Wayne A. Langel
(74) Attorney, Agent, or Firm—Webb Ziesenheim Logsdon Orkin & Hanson, P.C.

(57) ABSTRACT

A process for producing a highly purified aqueous hydrogen peroxide solution by removing silicon oxide impurities from an aqueous hydrogen peroxide solution containing silicon oxide impurities by adding a flocculating agent and filtering out impurities of solid content contained in the aqueous hydrogen peroxide solution with a precision filter, thereafter bringing the aqueous hydrogen peroxide solution into contact with an anion exchange resin in a fluoride ion form by at least one fluoride compound which contains 0.05% by weight or less of $SiF_6$ and is selected from the group consisting of sodium fluoride, potassium fluoride and ammonium fluoride.

15 Claims, No Drawings

PROCESS FOR PRODUCING A PURIFIED AQUEOUS HYDROGEN PEROXIDE SOLUTION

TECHNICAL FIELD

The present invention relates to a process for producing a purified aqueous hydrogen peroxide solution, and more particularly to a process for producing an aqueous hydrogen peroxide solution having a high purity, which enables the removal of silicon oxide impurities contained in an aqueous hydrogen peroxide solution with accuracy up to ppt order ($1/10^{12}$).

BACKGROUND OF THE INVENTION

An aqueous hydrogen peroxide solution is widely used in various fields, for example, for a bleaching agent for paper or pulp and as a component in chemical polishing fluids. In recent years, hydrogen peroxide has increasingly been used in the electronic industry, for example, as a cleaning agent for silicon wafers and as a cleaning agent in production processes of semiconductors. Accordingly, hydrogen peroxide requires a very high purity by extremely decreasing a variety of impurities in an aqueous hydrogen peroxide solution.

In general, hydrogen peroxide is produced almost exclusively by an anthraquinone process at present. The anthraquinone process is conducted as follows. A derivative of anthraquinone, such as a 2-alkylanthraquinone, is converted into the anthrahydroquinone by hydrogenation in a water-insoluble solvent in the presence of a hydrogenation catalyst. After the catalyst is removed, the reaction product is oxidized with air to regenerate the 2-alkylanthraquinone, and hydrogen peroxide is produced at the same time. By extracting the produced hydrogen peroxide from the oxidation with water, an aqueous solution containing hydrogen peroxide can be obtained. This process is called the anthraquinone auto-oxidation process.

The aqueous hydrogen peroxide solution produced by this process contains inorganic ions such as Al, Fe, Cr, Na, and Si, and inorganic compound impurities, which are derived from materials constituting the apparatus. Therefore, higher purity of an aqueous hydrogen peroxide solution is achieved by removing these impurities so as to meet a quality required.

As the process for purification of an aqueous hydrogen peroxide solution by removing those impurities such as inorganic ions and compounds contained in the aqueous hydrogen peroxide solution, for example, the process comprising bringing an aqueous hydrogen peroxide solution into contact with a strongly acidic cation exchange resin is known. When the strongly acidic cation exchange resin is thus used, cationic metal ion impurities such as Na, K and Ca can be easily removed. In the process described above, there remains trace amount of anionic impurities such as $SO_4^{2-}$, and Al ion, Fe ion, Cr ion which sometimes form anionic metal chelate impurities Therefore, such anionic impurities and anionic metal chelate impurities are generally removed by contacting these impurities with the strongly acidic cation exchange resin.

However, in the above conventional processes, it is hardly possible to remove silicon oxide impurities contained in an aqueous hydrogen peroxide solution.

Therefore, many methods have been proposed to remove silicon oxide impurities contained in an aqueous hydrogen peroxide solution.

For example, Japanese Patent Application Laid-Open Publication No. 9(1997)-142812 discloses a process for removing silicon oxide impurities by bringing an aqueous hydrogen peroxide solution containing silicon oxide impurities into contact with an anion exchange resin in the fluoride ion form.

Japanese Patent Application Laid-Open Publication No. 9(1997)-221305 discloses a process for removing silicon oxide impurities by filtrating an aqueous hydrogen peroxide solution with an ultra-filter. It is described therein that, in the process, pH of hydrogen peroxide is preferably preset at 3 to 5 and the aqueous hydrogen peroxide solution may be further brought into contact with an ion exchange resin after an ultra-filtration process.

Japanese Patent Application Laid-Open Publication No. 9(1997)-235107 discloses a process wherein a fluoride compound is added to an aqueous hydrogen peroxide solution and the mixture is brought into contact firstly with a cation exchange resin in a $H^+$ form having sulfonic acid group and secondly with an anion exchange resin.

Further, Japanese Patent Application Laid-Open Publication No. 11(1999)-79717 discloses a process for producing a purified aqueous hydrogen peroxide solution by bringing an aqueous hydrogen peroxide solution into contact with a strongly basic anion exchange resin in a hydroxide ion form after adding hydrogen fluoride of not less than 0.05 milliequivalent per liter of aqueous hydrogen peroxide solution to an aqueous hydrogen peroxide solution.

Other than the processes for purification described above, there are other processes for purification known, wherein some of RO (reverse osmolysis membrane) apparatus, a cation exchange resin tower, an anion exchange resin tower, a Mix bed (a mixed bed resin), an ultra-filtration apparatus, a chelate resin treatment, an absorption resin treatment, an addition of absorbent and so on are used in combination.

However, in the above processes, the content of Si is only reduced to about 1 ppb order. Therefore, an aqueous hydrogen peroxide solution purified by conventional processes could hardly be used in the field wherein a high purity is required such as in the field of the electronic industry. In the conventional processes of purification described above, there was another problem that the reproducibility of removal level of silicon oxide impurities was low and an aqueous hydrogen peroxide solution could not be efficiently purified.

Under these circumstances, the present inventors conducted extensive studies to solve the problems described above. As the result of the studies, it was discovered that there exists both soluble silica and insoluble silica (suspended particles or colloid) in the silicon oxide impurities contained in an aqueous hydrogen peroxide solution. It was also discovered that, when insoluble silica is filtered out with a precision filter after adding a flocculating agent to an aqueous hydrogen peroxide solution and soluble silica is further removed by using an anion exchange resin changed into a fluoride ion form by at least one fluoride compound which contains 0.05% by weight or less of $SiF_6$ and is selected from the group consisting of sodium fluoride, potassium fluoride and ammonium fluoride, the concentration of Si in an aqueous hydrogen peroxide solution could be reduced up to ppt order ($1/10^{12}$), and the reproducibility of removing silicon oxide impurities level was very high. The present invention has been completed on the basis of these findings.

The above Japanese Patent Application Laid-Open Publication No. 9(1997)-1428 12 also discloses a process for removing silicon oxide impurities by bringing an aqueous hydrogen peroxide solution containing silicon oxide impurities into contact with an anion exchange resin in the fluoride ion form. Usually, silicon compounds such as $SiF_6$ are contained in high amounts as impurities in sodium fluoride, potassium fluoride, ammonium fluoride and the like (hereinafter called "regenerant") which are used when changing an anion exchange resin into the fluoride ion form. As a result of the present inventors' further studies, it was discovered that such silicon compound impurities in the regenerant could hardly be removed from an ion exchange resin to a sufficient degree and therefore, silicon compound impurities derived from the regenerant might be mixed into an aqueous hydrogen peroxide solution when an aqueous hydrogen peroxide solution was brought into contact with the ion exchange resin, which caused the inferior reproducibility of the concentration of Si in a purified aqueous hydrogen peroxide solution. On the other hand, when the regenerant containing a controlled amount of $SiF_6$ to a certain level or less is used in the present invention, silicon compound impurities do not remain in an ion exchange resin, thereby silicon oxide impurities can be removed to an extremely high degree and it is also possible to realize a higher reproducibility of the removal level.

An object of the present invention is to provide a process for producing a highly purified aqueous hydrogen peroxide solution from which silicon oxide impurities are removed to a minimum by purifying an aqueous hydrogen peroxide solution containing silicon oxide impurities.

SUMMARY OF THE INVENTION

The present invention provides a process for producing a highly purified aqueous hydrogen peroxide solution by removing silicon oxide impurities contained in an aqueous hydrogen peroxide solution, which comprises:

adding a flocculating agent to an aqueous hydrogen peroxide solution containing silicon oxide impurities, and filtering out impurities of solid content contained in the aqueous hydrogen peroxide solution with a precision filter, thereafter bringing the aqueous hydrogen peroxide solution obtained as above into contact with an anion exchange resin in a fluoride form changed by at least one fluoride compound which contains 0.05% by weight or less of $SiF_6$ and is selected from the group consisting of sodium fluoride, potassium fluoride and ammonium fluoride.

Thus, a flocculating agent is added to an aqueous hydrogen peroxide solution in advance, then insoluble silica is removed by filtration using a precision filter. Subsequently, soluble silica is removed by using an anion exchange resin in a fluoride form changed by a fluoride compound wherein the amount of $SiF_6$ is controlled to a certain amount or less As a result, it becomes possible to remove the silicon oxide impurities contained in an aqueous hydrogen peroxide solution up to ppt order ($1/10^{12}$). Furthermore, the present process realizes the higher reproducibility of removing such silicon oxide impurities.

The present invention also provides a process for producing a purified aqueous hydrogen peroxide solution by removing silicon oxide impurities contained in an aqueous hydrogen peroxide solution to a minimum, which comprises:

adding a flocculating agent to an aqueous hydrogen peroxide solution containing silicon oxide impurities, and filtering out impurities of solid content contained in the aqueous hydrogen peroxide solution with a precision filter, thereafter bringing the obtained aqueous hydrogen peroxide solution into contact with:
(i) an $H^+$ cation exchange resin, then
(ii) an anion exchange resin changed in a fluoride form by at least one fluoride compound which contains 0.05% by weight or less of $SiF_6$ and is selected from the group consisting of sodium fluoride, potassium fluoride and ammonium fluoride, then
(iii) an anion exchange resin in the carbonate form or bicarbonate form, thereafter
(iv) a cation exchange resin in $H^+$ form.

In the present invention, it is preferred that the concentration of hydrogen peroxide contained in an aqueous hydrogen peroxide solution is 40 to 70% by weight. Especially, silicon oxide impurities can be removed with efficiency when the aqueous hydrogen peroxide solution having such concentration is used.

It is preferred that a flocculating agent is at least one phosphorus compound selected from the group consisting of phosphoric acid, polyphosphoric, disodium dihydrogen pyrophosphate, aminotri (methylenephosphonic acid) and the salt thereof, and ethylenediaminetetra (methylenephosphonic acid) and the salt thereof. It is preferred that the said phosphorus compound be added in an amount that the atomic ratio (Si/P) of silicon oxide impurities contained in an aqueous hydrogen peroxide solution in terms of silicon atom to the phosphorus compound in terms of phosphorus atom is 0.0001 or less.

It is preferred that the average pore diameter of the precision filter used in the present invention be 0.2 $\mu$m or less.

DETAILED DESCRIPTION OF THE INVENTION

A process for producing a purified aqueous hydrogen peroxide solution according to the present invention is described in detail hereinafter. Ppm, ppb and ppt used in the present specification means ppm by weight, ppb by weight and ppt by weight, respectively.

An aqueous hydrogen peroxide solution used as a feedstock in the present invention is produced by a publicly known process such as an anthraquinone auto-oxidation process, a direct synthesis process by a direct reaction of hydrogen and oxygen, and so on.

In the aqueous hydrogen peroxide solution, silicon oxide impurities are generally contained in an amount of a few to a few tens of ppm. These silicon oxide impurities are derived from water used in production (extraction, distillation and dilution), silica components suspended in the air and materials constituting production facilities.

Such silicon oxide impurities include both insoluble silica components and soluble silica components. Insoluble silica components are particles or colloidal silica, and soluble silica components are silicate and the like.

In a process for producing a purified aqueous hydrogen peroxide solution according to the present invention, first, a flocculating agent is added to an aqueous hydrogen peroxide solution, thereafter the resulting solution is filtered out using a precision filter, and insoluble silica components contained in the aqueous hydrogen peroxide solution are removed as impurities of solid materials.

The concentration of hydrogen peroxide in such aqueous hydrogen peroxide solution is 40 to 70% by weight, preferably 45 to 65% by weight. Especially, silicon oxide impurities can be removed with efficiency when the aqueous hydrogen peroxide solution having such high concentration is used.

A flocculating agent is added in order to flocculate and filter out the insoluble silica components contained in an aqueous hydrogen peroxide solution. As the flocculating agent, a phosphorus compound is usually used. As the phosphorus compound, at least one phosphorus compound selected from the group consisting of phosphoric acid, polyphosphoric acid, disodium dihydrogen pyrophosphate, aminotri (methylenephosphonic acid) and the salt thereof, and ethylenediaminetetra (methylenephosphonic acid) and the salt thereof, is preferably used.

It is preferred that the said phosphorus compound be added in an amount that the atomic ratio (Si/P) of silicon oxide impurities contained in an aqueous hydrogen peroxide solution in terms of silicon atom to the phosphorus compound in terms of phosphorus atom is 0.0001 or less, desirably 0.00001–0.0001.

The solution is desirably aged for one day or more, preferably for one day to 5 days after adding the phosphorus compound thereto. The aging may be carried out under the condition of either stirring or not stirring. By this aging, insoluble silica components are flocculated and grow so as to be filtered out.

The insoluble silica components are filtered out using a cartridge-type precision filter.

The average pore diameter of the precision filter used in the present invention is desirably 0.2 $\mu$m or less, preferably 0.1 $\mu$m or less. There is no particular restriction on materials constituting the precision filter on condition that they do not contain components which may be eluted into an aqueous hydrogen peroxide solution. For example, the filter made from fluororesin, polyolefin resin such as polyethylene or polypropylene, polysulfone resin, or polycarbonate resin are used. Among them, the filter made from fluororesin is particularly preferable.

According to the present invention, a flocculating agent is added to an aqueous hydrogen peroxide solution for filtration using a precision filter and, thereafter, the hydrogen peroxide may be brought into contact with an adsorption resin. By contact with the adsorption resin, organic impurities can be further removed to a higher degree.

As the adsorption resin, a porous resin is used. The porous resin comprises a styrene-divinylbenzene copolymer and has no ion exchange group. The porous resin desirably has a specific surface area in a dry state (BET method ($N_2$)) of about 200 to 900 m$^2$/g, preferably 400 to 900 m$^2$/g. Further, such resins are desirable having a continuous pore of a pore volume in a dry state of about 0.6 to 1.2 ml/g, preferably about 0.7 to 1.12 ml/g as measured by the mercury porosimetry method. As the porous resin, a resin which is constituted from styrene crosslinked by divinylbenzene and has a network structure is used. Such the adsorption resin includes Amberlite XAD-2 and XAD-4 produced by Robin & Haas Company and HP10, HP20, HP21, HP30, HP40, HP50, SP800 and SP900 produced by MITSUBISHI CHEMICAL CORPORATION.

Further, a porous resin containing halogen can be used as an absorption resin. Preferable examples of the halogen-containing porous resin include a halide of a crosslinked polymer of an aromatic monovinyl monomer such as styrene and vinyltoluene and an aromatic polyvinyl monomer such as divinylbenzene and trivinylbenzene, a crosslinked polymer of a halogenated aromatic monovinyl monomer such as monochlorostyrene and monobromstyrene and an aromatic polyvinyl monomer and a crosslinked polymer of a halogenated aromatic monovinyl monomer, an aromatic monovinyl monomer and an aromatic polyvinyl monomer. As the halogen-containing porous resin, a halide of styrene-divinylbenzene copolymer is preferably used, and, for example, the trade name, "SEPABEADS SP207", which is a copolymer of brominated styrene-divinylbenzene and has a specific gravity of about 1.2, can be listed. Further there can be used the absorption resin in which a hydrophilic group such as a hydroxyl group, chloroalkyl group or an alkyl hydroxide group is introduced into a crosslinked copolymer of an aromatic monovinyl monomer and an aromatic polyvinyl monomer. The chloroalkyl group is represented by the formula of —($CH_2$)$_n$Cl and the hydroxy alkyl group is represented by the formula of —($CH_2$)$_n$OH. The longer a straight chain of alkyl group is, the weaker the hydrophilic property is, and therefore, practically preferable are those having n of 1 to 5. The resins are commercially available items. For example, the trade name "bophachett EP63" produced by Bayer is well known.

By such the treatment process with the porous resin, impurities (TOC) such as organic impurities contained in an aqueous hydrogen peroxide solution can be highly removed.

For the next step, the aqueous hydrogen peroxide solution is brought into contact with an anion exchange resin changed (converted) into the fluoride ion form by at least one fluoride compound which contains a very small amount of $SiF_6$ and is selected from the group consisting of sodium fluoride, potassium fluoride and ammonium fluoride (Such fluoride compound is hereinafter called "regenerant").

By contact with an anion exchange resin in the fluoride ion form, a soluble silica dissolved in the aqueous hydrogen peroxide solution is trapped by an anion exchange resin and removed.

It is preferred that the amount of $SiF_6$ contained in a fluoride compound as a regenerant be 0.05% by weight or less, more preferably 0.01% by weight or less. When the amount of $SiF_6$ contained in the regenerant is such as above, it is possible to remove the silicon oxide impurities contained in an aqueous hydrogen peroxide solution up to ppt level ($1/10^{12}$), and furthermore, the reproducibility level of removing such silicon oxide impurities is also high. When $SiF_6$ content in the regenerant is larger than the above, $SiF_6$ cannot be thoroughly removed by washing after the regeneration of an anion exchange resin in the fluoride ion form. Therefore, it happens that $SiF_6$ derived from the regenerant leaks out to get mixed into the purified aqueous hydrogen peroxide solution when an aqueous hydrogen peroxide solution is brought into contact with an anion exchange resin in the fluoride ion form. And the Si content remained in the purified aqueous hydrogen peroxide solution may be ranged.

The anion exchange resin used in this invention is a strongly basic anion exchange resin obtained by chloromethylation of a styrene-divinylbenzene crosslinked copolymer, followed by amination of the product by trimethylamine or dimethylethanolamine and subsequently by forming a quaternary salt of the product of amination (the exchange resin is a quaternary ammonium group); weak basic anion exchange resins derived from a styrene-divinylbenzene crosslinked copolymer and having a primary, secondary, or tertiary amine as the ion exchange group; an acrylic acid type crosslinked polymer having a tertiary amine as the exchange group; and pyridine type anion exchange resins comprising a polymer having a pyridyl group or a substituted pyridyl group. Of these, strongly basic anion exchange resins having a quaternary ammonium group as an exchange group are preferably used in the present invention.

Various anion exchange resins having a quaternary ammonium group as an exchange group are commercially available. For example, products of DIAION PA series such as PA316 and PA416, DIAION SA series such as SA10A and SA20A and products of Amberlite IRA series such as IRA-400, IRA-410, IRA-900 and IRA-904 are exemplified. Such resins are generally commercially available in the form of a chloride ion form.

In the present invention, as an ion form before changing into a fluoride ion form, a commercially available chloride ion form may be used per se. The ion forms used in the conventional technology for purification of hydrogen peroxide, such as a hydroxide ion form, a carbonate ion form or bicarbonate ion form, are also available. Moreover, an ion form other than those may be used.

An anion exchange resin can be changed into the fluoride ion form by bringing the aqueous solution containing the regenerant described above into contact with the anion exchange resin. The following process may be used to bring the aqueous solution containing the regenerant into contact with an anion exchange resin; an anion exchange resin is packed into an ion exchange resin tower (a regeneration tower) in a continuous flow process, and the aqueous solution containing the regenerant is passed through downward, thereafter ultra-pure water is passed from below upward. This operation counts as one step. The resin is desirably regenerated by conducting the above step twice or more, preferably 2 to 12 times.

Usually, an anion exchange resin is brought into contact with a regenerant aqueous solution by a process that the regenerant aqueous solution is passed through and then ultra-pure water is passed through for washing the resin. In the present invention, a cycle of passing of regenerant/ultra-pure water washing is desirably repeated particularly two or more times. By repeating the fluorine compound aqueous solution/ultra-pure water passing, an ion exchange resin can be effectively and homogenously regenerated and further can be washed up to the inside of the resin due to contraction and swelling of the resin.

The concentration of the regenerant is usually 1 to 4% by weight, preferably 2 to 4% by weight. The amount of the regenerant aqueous solution to be passed through is three times or more, preferably 4 to 12 times of the resin volume.

Such regenerant aqueous solution is usually passed through a downflow at SV (space velocity)=1 to 5 $Hr^{-1}$, and BV (Bed Volume; showing the volume of ion exchange resin processed. A unit is L/L-R) 0.5 to 1 L/L-R. Then, ultra-pure water is passed through an upflow at SV=10 to 30 $Hr^{-1}$ and BV=0.1 to 0.5 L/L-R for washing.

After the regenerant solution and ultra-pure water has passed through, another washing with ultra-pure water is conducted to further wash an ion exchange resin after regeneration. In this washing, the sequence of a downflow and upflow of ultra-pure water is taken as one step and 4 to 9 steps are carried out. It is preferred that the ultra-pure water be passed through an upflow at SV=10 to 30 $Hr^{-1}$ and BV=3 to 5 L/L-R, and a downflow at SV=10 to 30 $Hr^{-1}$ and BV=3 to 5 L/L-R. It is also preferred that the washing be conducted with 30 to 60 times volume of ultra-pure water relative to the resin volume.

Thus, by repeating the fluorine compound aqueous solution-ultra-pure water passing, an ion exchange resin can be effectively and homogenously regenerated and further can be washed up to the inside of the resin due to contraction and swelling of the resin.

In the present invention, a continuous flow process is used for bringing the aqueous hydrogen peroxide solution containing impurities into contact with the anion exchange resin in the fluoride ion form. It is preferred that the aqueous hydrogen peroxide solution be passed through the resin layer at a space velocity (SV) of 5 to 40 $Hr^{-1}$, preferably 10 to 30 $Hr^{-1}$.

In case of the anion exchange resin in the fluoride ion form, an aqueous hydrogen peroxide solution is not decomposed. Therefore, safety precautions such as the prevention against cracked gases is hardly required.

It is also effective that, after the aqueous hydrogen peroxide solution is brought into contact with the anion exchange resin in the fluoride ion form to reduce silicon oxide impurities, the aqueous hydrogen peroxide solution is further brought into contact with publicly known resins, namely, a strongly acidic cation exchange resin having a sulfonic acid group and a strongly basic anion exchange resin such as an anion exchange resin in a bicarbonate form. The purified aqueous hydrogen peroxide solution processed with an anion exchange resin in the fluoride ion form contains the fluoride ion generated by ion exchange, which can be removed by contact with a normal anion exchange resin in a bicarbonate form, and the like. Thus, when an anion exchange resin in the fluoride ion form is used in combination with a known anion and cation exchange resin, the order of contact can be properly selected according to the components of the purified aqueous hydrogen peroxide solution to be used.

In combination of an anion and cation exchange resin, it is preferred that the aqueous hydrogen peroxide solution be passed through a cation exchange resin, an anion exchange resin in the fluoride ion form, an anion exchange resin, and an cation exchange resin, in this order.

Especially, when the aqueous hydrogen peroxide solution is passed through $H^+$ cation exchange resin, an anion exchange resin in the fluoride ion form, cation exchange resin in the carbonate ion form or in the bicarbonate ion form and $H^+$ cation exchange resin in this order, even impurity components other than silicon oxide impurities can be removed to a minimum. As a result, metal ion impurities contained in an aqueous hydrogen peroxide solution can be effectively removed, and a very high-quality aqueous hydrogen peroxide solution having a metal ion impurity content of a few ppt levels or its vicinities can be produced. Further, the aqueous hydrogen peroxide solution purified by the process of the present invention has a good and stable duplicativity of the level of removing metal ion impurities.

To the aqueous hydrogen peroxide solution thus obtained, ultra-pure water is further added as necessary to prepare the concentration of hydrogen peroxide. The ultra-pure water, wherefrom impurities are removed to a high degree, is preferably used.

Following the procedure described above, it is possible to produce a highly purified aqueous hydrogen peroxide solution, wherefrom silicon oxide impurities are removed up to ppt level.

In the present invention, prior to the procedure described above, a purified aqueous hydrogen peroxide solution, wherefrom other metal ion impurities are highly removed by a known process, may be used. As an alternative way, from the highly pure aqueous hydrogen peroxide solution obtained by the process of the present invention, other metal ion impurities may be removed by using a known process. The known processes to remove the other metal ion impurities and the like include a distillation, an ultra-filtration, a process using an absorption resin, and a chelate resin and so on. When these processes are combined with the process of the present invention, not only silicon oxide impurities but also other metal ion impurities and the like can be highly removed.

According to the present invention, silicon oxide impurities contained in an aqueous hydrogen peroxide solution can be removed effectively to produce an aqueous hydrogen peroxide solution of very high quality, wherein a content of Si is 50 ppt or less. Further, in the process of the present invention, the reproducibility of the content of Si is high and stable.

EXAMPLE

The present invention is further described with reference to the following examples. However, it should be construed that the present invention is in no way limited to those examples.

In the examples, metal ion impurities were measured by a flameless atomic absorption spectroscopy, ICP-AES and ICP-MS. Ppm, ppb and ppt means ppm by weight, ppb by weight and ppt by weight, respectively.

Example 1

Disodium dihydrogen pyrophosphate was added to 60% by weight of an aqueous hydrogen peroxide solution containing silicon oxide impurities (concentration of Si: 2 ppb) to attain a concentration of 0.077 g/liter. Then, the solution was allowed to stand for 3 days to be aged, thereafter it was subjected to filtration with a filter having an average pore diameter of 0.1 $\mu$m. The ratio of phosphorus atom in disodium dihydrogen pyrophosphate added and Si atom in silicon oxide impurities (Si/P atomic ratio) was 0.00009.

The aqueous hydrogen peroxide solution after filtration was passed continuously at a space velocity (SV)=15 $Hr^{-1}$ through the column into which an anion exchange resin in the fluoride ion form was packed; and brought into contact with an anion exchange resin in the fluoride ion form to be purified.

As the anion exchange resin in the fluoride ion form, the spent anion exchange resin SA20A in the bicarbonate form was regenerated to the fluoride ion form. As the regenerant, 3% by weight of sodium fluoride solution (amount of $SiF_6$: 100 ppm or less) was used. The regeneration of the anion exchange resin in the fluoride ion form was conducted as follows. The anion exchange resin in the bicarbonate form was packed into a regeneration tower which is different from one for purification. The regenerant solution was passed through at SV=2.25 $Hr^{-1}$ and BV=0.75 L/L-R of a downflow, then the flow of the solution was stopped, and ultra-pure water was passed through at SV=13.2 $Hr^{-1}$ and BV=0.3 L/L-R of an upflow. This operation was taken as one step and this step was repeated 6 times. Then, ultra-pure water was passed through at SV=13.2 $Hr^{-1}$ and BV=3.3 L/L-R of a downflow, thereafter at the same rate of SV and BV of an upflow. This operation was taken as one step. This step was repeated 6 times to wash with ultra-pure water and prepare the anion exchange resin in the fluoride ion form. The anion exchange resin in the fluoride ion form thus regenerated was packed into a purification tower (an ion exchange resin tower) in slurry.

Thereafter, the solution was diluted with ultra-pure water (concentration of Si: 50 ppt or less) to prepare the aqueous hydrogen peroxide solution having a concentration of hydrogen peroxide of 31% by weight.

The concentration of Si in the purified aqueous hydrogen peroxide solution obtained was measured. It was not more than 50 ppt.

Example 2

Aminotori (methylenephosphonic acid) was added to 60% by weight of an aqueous hydrogen peroxide solution containing silicon oxide impurities (concentration of Si: 43 ppb) to attain a concentration of 1.39 g/liter. Then, the solution was allowed to stand for 3 days to be aged, thereafter it was subjected to filtration with a filter having an average pore diameter of 0.1 $\mu$m. The ratio of phosphorus atom in aminotori(methylenephosphonic acid)added and Si atom in silicon oxide impurities (Si/P atomic ratio) was 0.0001.

The aqueous hydrogen peroxide solution after filtration was passed continuously at a space velocity (SV)=15 $Hr^{-1}$ through the column into which the same anion exchange resin in the fluoride ion form as that in Example 1 was packed, and brought into contact with an anion exchange resin in the fluoride ion form to be purified.

The aqueous hydrogen peroxide solution coming out of the purification tower was diluted with ultra-pure water (concentration of Si: 50 ppt or less) to prepare the aqueous hydrogen peroxide solution having a concentration of hydrogen peroxide of 31% by weight.

The concentration of Si in the purified aqueous hydrogen peroxide solution obtained was measured. It was not more than 50 ppt.

Example 3

As in Example 1, the aqueous hydrogen peroxide solution after filtration was passed continuously at 15 $Hr^{-1}$ of a space velocity (SV) through the column into which a cation exchange resin in the $H^+$ form was packed, and brought into contact with the cation exchange resin in the $H^+$ form. Thereafter, the solution was passed continuously at 15 $Hr^{-1}$ of a space velocity (SV) through the column into which an anion exchange resin in the fluoride ion form was packed, and brought into contact with the anion exchange resin in the fluoride ion form. After that, with cooling to −3° C., the solution was passed continuously at 15 $Hr^{-1}$ of a space velocity (SV) through the column into which an anion exchange resin in the bicarbonate ion form was packed, and brought into contact with the anion exchange resin in the bicarbonate ion form. Subsequently, the solution was passed continuously at 15 $Hr^{-1}$ of a space velocity (SV) through the column into which a cation resin in the $H^+$ form of the second step was packed, and brought into contact with the cation exchange resin in the $H^+$ form of the second step.

Each ion exchange resin used was regenerated as follows.

The regeneration of the above ion exchange resin was conducted in the ion exchange tower (regeneration tower) which is different from the purification tower for an aqueous hydrogen peroxide solution.

Regeneration of an Ion Exchange Resin

The spent SKLB was used as a cation exchange resin in the $H^+$ form of the first and second steps. 10% by weight of an aqueous hydrochloric acid solution was used as the regenerant. The solution containing the regenerant was passed through at SV=2.25 $Hr^{-1}$ and BV=0.75 L/L-R of a downflow, then the flow of the solution was stopped, and ultra-pure water was passed through at SV=13.2 $Hr^{-1}$ and BV=0.3 L/L-R of an upflow. This operation was taken as one step and this step was repeated 10 times. Then, ultra-pure water was passed through at SV=13.2 Hr$^{-1}$ and BV=3.3 L/L-R of a downflow, thereafter at the same rate of SV and BV of an upflow. This operation was taken as one process step. This step was repeated 6 times to wash with ultra-pure water and prepare a regenerated cation exchange resin in H$^+$ form.

As the anion exchange resin in the fluoride ion form, the spent SA20A was regenerated and used. As the regenerant, 3% by weight of sodium fluoride solution (amount of SiF$_6$: 100 ppm or less) was used. The regenerant solution was passed through at SV=2.25 Hr$^{-1}$ and BV=0.75 L/L-R of a downflow, then the flow of the solution was stopped, and ultra-pure water was passed through at SV=13.2 Hr$^{-1}$ and BV=0.3 L/L-R of an upflow. This operation was taken as one step and this step was repeated 6 times. Then, ultra-pure water was passed through at SV=13.2 Hr$^{-1}$ and BV=3.3 L/L-R of a downflow, thereafter at the same rate of SV and BV of an upflow. This operation was taken as one process step and this step was repeated 6 times for washing with ultra-pure water to prepare the regenerated anion exchange resin in the fluoride ion form.

As the anion exchange resin in the bicarbonate form, the spent SA20A was used. First, it was regenerated with sodium hydroxide. As the regenerant, 5% by weight of aqueous sodium hydroxide solution was used. Subsequently, the regenerant solution was passed through at SV=2.25 Hr$^{-1}$ and BV=0.75 L/L-R of a downflow, then the flow of the solution was stopped, and ultra-pure water was passed through at SV=13.2 Hr$^{-1}$ and BV=0.3 L/L-R under an upward-moving stream. This operation was taken as one process step and this step was repeated 6 times. Then, ultra-pure water was passed through at SV=13.2 Hr$^{-1}$ and BV=3.3 L/L-R of a downflow, thereafter at the same rate of SV and BV of an upflow. This operation was taken as one step and this step was repeated 5 times for washing with ultra-pure water.

Subsequently, this anion exchange resin was regenerated with sodium bicarbonate. As the regenerant, 8% by weight of aqueous sodium bicarbonate solution was used. First, the regenerant solution was passed through at SV=2.25 Hr$^{-1}$ and BV=0.75 L/L-R of a downflow, then the flow of the solution was stopped, and ultra-pure water was passed through at SV=13.2 Hr$^{-1}$ and BV=0.3 L/L-R of an upflow. This operation was taken as one step and this step was repeated 12 times. Then, ultra-pure water was passed through at SV=13.2 Hr$^{-1}$ and BV=3.3 L/L-R of a downflow, thereafter at the same rate of SV and BV of an upflow. This operation was taken as one step and this step was repeated 6 times for washing with ultra-pure water. The regenerated anion exchange resin in the bicarbonate form was thus prepared.

Each exchange resin regenerated as above was packed, in slurry, into each purification column.

After the flow of aqueous hydrogen peroxide solution through the column, the purified aqueous hydrogen peroxide solution was diluted with ultra-pure water, wherefrom impurities were highly removed, to prepare the aqueous hydrogen peroxide solution having a concentration of hydrogen peroxide of 31% by weight.

The concentration of Si in the purified aqueous hydrogen peroxide solution obtained was measured. It was not more than 50 ppt. And other impurities are also removed.

The amount of impurities contained in the purified aqueous hydrogen peroxide solution obtained is shown in Table 1.

TABLE 1

An amount of impurities in the aqueous hydrogen peroxide solution

| | measuring limit (ppt) | measured value (ppt) | | measuring limit (ppt) | measured value (ppt) |
|---|---|---|---|---|---|
| Ag | 0.5 | ND | Mg | 0.2 | ND |
| Al | 0.2 | 0.2 | Mn | 0.3 | ND |
| As | 2 | ND | Mo | 0.3 | ND |
| Au | 0.2 | ND | Na | 0.5 | ND |
| B | 4 | ND | Nb | 0.1 | ND |
| Ba | 0.1 | ND | Ni | 0.7 | ND |
| Be | 5 | ND | Pb | 0.1 | ND |
| Bi | 0.2 | ND | Pd | 0.3 | ND |
| Ca | 2 | ND | Pt | 0.2 | ND |
| Cd | 0.3 | ND | Sb | 0.3 | ND |
| Co | 1 | ND | Si | 50 | ND |
| Cr | 1 | 1 | Sn | 0.8 | ND |
| Cu | 0.5 | ND | Sr | 0.05 | ND |
| Fe | 0.5 | 0.7 | Ta | 0.1 | ND |
| Ga | 0.5 | ND | Ti | 2 | ND |
| Ge | 2 | ND | Tl | 0.1 | ND |
| In | 0.1 | ND | V | 1 | ND |
| K | 2 | ND | Zn | 2 | ND |
| Li | 0.02 | ND | Zr | 0.1 | 0.1 |

ND shows the measured value is not more than the measuring limit.

Comparative Example 1

Disodium dihydrogen pyrophosphate was added to a 60% by weight of an aqueous hydrogen peroxide solution containing silicon oxide impurities. Then the solution was allowed to stand for three days to prepare a matured aqueous hydrogen peroxide solution. The Si concentration in the obtained aqueous hydrogen peroxide solution was 3.8 ppb and phosphorus concentration in the solution was 16 ppm. The ratio of phosphorus atom in the aqueous hydrogen peroxide solution and Si ion in silicon oxide impurities (Si/P atomic ratio) was 0.0002.

Without filtration, this aqueous hydrogen peroxide solution was passed continuously at a space velocity (SV) =15 Hr$^{-1}$ through the column into which the same anion exchange resin in the fluoride ion form as that in Example 1 was packed, and brought into contact with an anion exchange resin in the fluoride ion form to be purified.

The aqueous hydrogen peroxide solution coming out of the purification tower was diluted with ultra-pure water (concentration of Si: 50 ppt or less) to prepare the aqueous hydrogen peroxide solution having a concentration of hydrogen peroxide of 31% by weight.

The Si concentration in the purified aqueous hydrogen peroxide solution obtained was measured. It was 0.23 ppb.

Comparative Example 2

Disodium dihydrogen pyrophosphate was added to a 60% by weight of an aqueous hydrogen peroxide solution containing silicon oxide impurities (concentration of Si: 2.4 ppb) to attain a concentration of phosphorus ion of 20 ppm. Then the solution was allowed to stand for three days to mature, thereafter it was subjected to filtration with a filter having an average pore diameter of 0.1 μm. The ratio of P atom in disodium dihydrogen pyrophosphate added and Si atom in silicon oxide impurities (Si/P atomic ratio) was 0.00012.

The aqueous hydrogen peroxide solution after filtration was passed continuously at a space velocity (SV)=15 Hr$^{-1}$ through the column into which an anion exchange resin in the fluoride ion form was packed, and brought into contact with an anion exchange resin in the fluoride ion form to be purified. As the anion exchange resin in the fluoride ion form, the spent anion exchange resin SA20A in the bicarbonate form was used after regeneration with following regenerant as in Example 1. As the regenerant, 1.5% by weight of sodium fluoride solution (amount of $SiF_6$ :0.1–0.3% by weight) was used.

The purified aqueous hydrogen peroxide solution was diluted with ultra-pure water (concentration of Si: 50 ppt or less) to prepare the aqueous hydrogen peroxide solution having a concentration of hydrogen peroxide of 31% by weight.

The Si concentration in the purified aqueous hydrogen peroxide solution obtained was measured. It was 1.1 ppb.

What is claimed is:

1. A process for producing a purified aqueous hydrogen peroxide solution by removing silicon oxide impurities contained in an aqueous hydrogen peroxide solution, which comprises:

adding a flocculating agent to an aqueous hydrogen peroxide solution containing silicon oxide impurities, and filtering out impurities of solid content contained in the aqueous hydrogen peroxide solution with a precision filter, thereafter bringing the aqueous hydrogen peroxide solution obtained as above into contact with an anion exchange resin in a fluoride ion form changed by at least one fluoride compound which contains 0.05% by weight or less of $SiF_6$ and is selected from the group consisting of sodium fluoride, potassium fluoride and ammonium fluoride, wherein the flocculating agent is a phosphorus compound, and the phosphorus compound is added in an amount that the atomic ratio (Si/P) of silicon oxide impurities contained in the aqueous hydrogen peroxide solution in terms of silicon atom to phosphorus compound in terms of phosphorus atom is 0.0001 or less.

2. A process for producing a purified aqueous hydrogen peroxide solution by removing silicon oxide impurities contained in an aqueous hydrogen peroxide solution, which comprises:

adding a flocculating agent to an aqueous hydrogen peroxide solution containing silicon oxide impurities, and filtering out impurities of solid content contained in the aqueous hydrogen peroxide solution with a precision filter, thereafter bringing the obtained aqueous hydrogen peroxide solution into contact with;

(i) a cation exchange resin in $H^+$ form, then (ii) an anion exchange resin in the fluoride ion form changed by at least one fluoride compound which contains 0.05% by weight or less of $SiF_6$ and is selected from the group consisting of sodium fluoride, potassium fluoride and ammonium fluoride, then (iii) an anion exchange resin in the carbonate ion form or bicarbonate form, thereafter (iv) a cation exchange resin in $H^+$ forms wherein the flocculating agent is a phosphorus compound, and the phosphorus compound is added in an amount that the atomic ratio (Si/P) of silicon oxide impurities contained in the aqueous hydrogen peroxide solution in terms of silicon atom to phosphorus compound in terms of phosphorus atom is 0.0001 or less.

3. The process for producing a purified aqueous hydrogen peroxide solution as claimed in claim 1, wherein the concentration of hydrogen peroxide is 40 to 70% by weight.

4. The process for producing a purified aqueous hydrogen peroxide solution as claimed in claim 1, wherein the said flocculating agent is at least one phosphorus compound selected from the group consisting of phosphoric acid, polyphosphoric acid, disodium dihydrogen pyrophosphate, aminotri(methylenephosphonic acid) and the salt thereof, and ethylenediaminetetra (methylenephosphonic acid) and the salt thereof.

5. The process for producing a purified aqueous hydrogen peroxide solution as claimed in claim 4, wherein the said phosphorus compound is added in an amount that the atomic ratio (Si/P) of silicon oxide impurities contained in an aqueous hydrogen peroxide solution in terms of silicon atom to phosphorus compound in terms of phosphorus atom is 0.0001 or less.

6. The process for producing a purified aqueous hydrogen peroxide solution as claimed in claim 1, wherein the average pore diameter of the precision filter is 0.2 μm or less.

7. The process for producing a purified aqueous hydrogen peroxide solution as claimed in claim 2, wherein the concentration of hydrogen peroxide is 40 to 70% by weight.

8. The process for producing a purified aqueous hydrogen peroxide solution as claimed in claim 2, wherein the said flocculating agent is at least one phosphorus compound selected from the group consisting of phosphoric acid, polyphosphoric acid, disodium dihydrogen pyrophosphate, aminotri(methylenephosphonic acid) and the salt thereof, and ethylenediaminetetra (methylenephosphonic acid) and the salt thereof.

9. The process for producing a purified aqueous hydrogen peroxide solution as claimed in claim 3, wherein the said flocculating agent is at least one phosphorus compound selected from the group consisting of phosphoric acid, polyphosphoric acid, disodium dihydrogen pyrophosphate, aminotri(methylenephosphonic acid) and the salt thereof, and ethylenediaminetetra (methylenephosphonic acid) and the salt thereof.

10. The process for producing a purified aqueous hydrogen peroxide solution as claimed in claim 8, wherein the said phosphorus compound is added in an amount that the atomic ratio (Si/P) of silicon oxide impurities contained in an aqueous hydrogen peroxide solution in terms of silicon atom to phosphorus compound in terms of phosphorus atom is 0.0001 or less.

11. The process for producing a purified aqueous hydrogen peroxide solution as claimed in claim 9, wherein the said flocculating agent is at least one phosphorus compound selected from the group consisting of phosphoric acid, polyphosphoric acid, disodium dihydrogen pyrophosphate, aminotri(methylenephosphonic acid) and the salt thereof, and ethylenediaminetetra (methylenephosphonic acid) and the salt thereof.

12. The process for producing a purified aqueous hydrogen peroxide solution as claimed in claim 2, wherein the average pore diameter of the precision filter is 0.2 μm or less.

13. The process for producing a purified aqueous hydrogen peroxide solution as claimed in claim 3, wherein the average pore diameter of the precision filter is 0.2 μm or less.

14. The process for producing a purified aqueous hydrogen peroxide solution as claimed in claim 4, wherein the average pore diameter of the precision filter is 0.2 μm or less.

15. The process for producing a purified aqueous hydrogen peroxide solution as claimed in claim 5, wherein the average pore diameter of the precision filter is 0.2 μm or less.

* * * * *

UNITED STATES PATENT AND TRADEMARK OFFICE
CERTIFICATE OF CORRECTION

PATENT NO. : 6,649,139 B2
DATED : November 18, 2003
INVENTOR(S) : Fujio Tanaka et al.

It is certified that error appears in the above-identified patent and that said Letters Patent is hereby corrected as shown below:

Column 1,
Line 58, between "impurities" and "Therefore" insert period -- . --.

Column 3,
Line 54, after "amount or less" insert period -- . --.

Column 10,
Line 59, "SKLB" should read -- SK1B --.

Column 13,
Line 56, "forms" should read -- form --.

Signed and Sealed this

Twenty-seventh Day of April, 2004

JON W. DUDAS
*Acting Director of the United States Patent and Trademark Office*